Sept. 22, 1964     O. B. CRUSE     3,149,542
FRICTION DEVICE OPERATING MECHANISM
Filed Oct. 12, 1962     2 Sheets-Sheet 1

INVENTOR
OLIVER B. CRUSE
BY *Joseph E. Papin*

United States Patent Office 3,149,542
Patented Sept. 22, 1964

3,149,542
FRICTION DEVICE OPERATING MECHANISM
Oliver B. Cruse, Florissant, Mo., assignor to Wagner Electric Corporation, St. Louis, Mo., a corporation of Delaware
Filed Oct. 12, 1962, Ser. No. 230,142
6 Claims. (Cl. 92—128)

This invention relates to friction device operating mechanisms having resiliently urged friction device energizing means therein and in particular to novel emergency release or disabling means for disabling said resiliently urged means.

An object of the present invention is to provide a friction device operating mechanism having novel emergency release or disabling means therein for disabling resiliently urged means operable in said friction device operating mechanism in response to the failure of fluid pressure applied thereto from a source of said fluid pressure to mechanically energize a friction device.

Another object of the present invention is to provide a novel emergency release mechanism which is economically manufactured and easily assembled.

These and other objects and advantages of the present invention will become apparent hereinafter.

Briefly, the invention embodies a friction device operating mechanism having resiliently urged means for mechanically energizing a friction device when fluid pressure supplied thereto from a fluid pressure source is less than a predetermined magnitude, and emergency release or disabling means for operative connection with said resiliently urged means to release or contain the friction device energizing force of said resiliently urged means.

Figure 1:
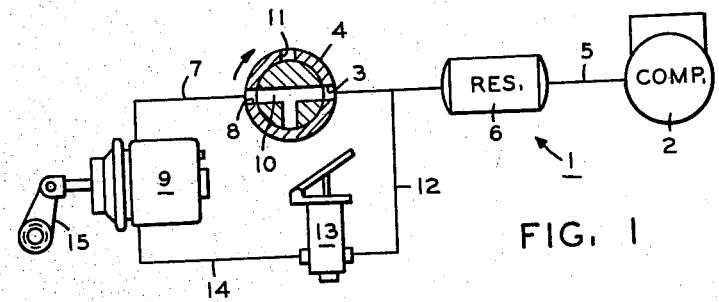
Figure 2:
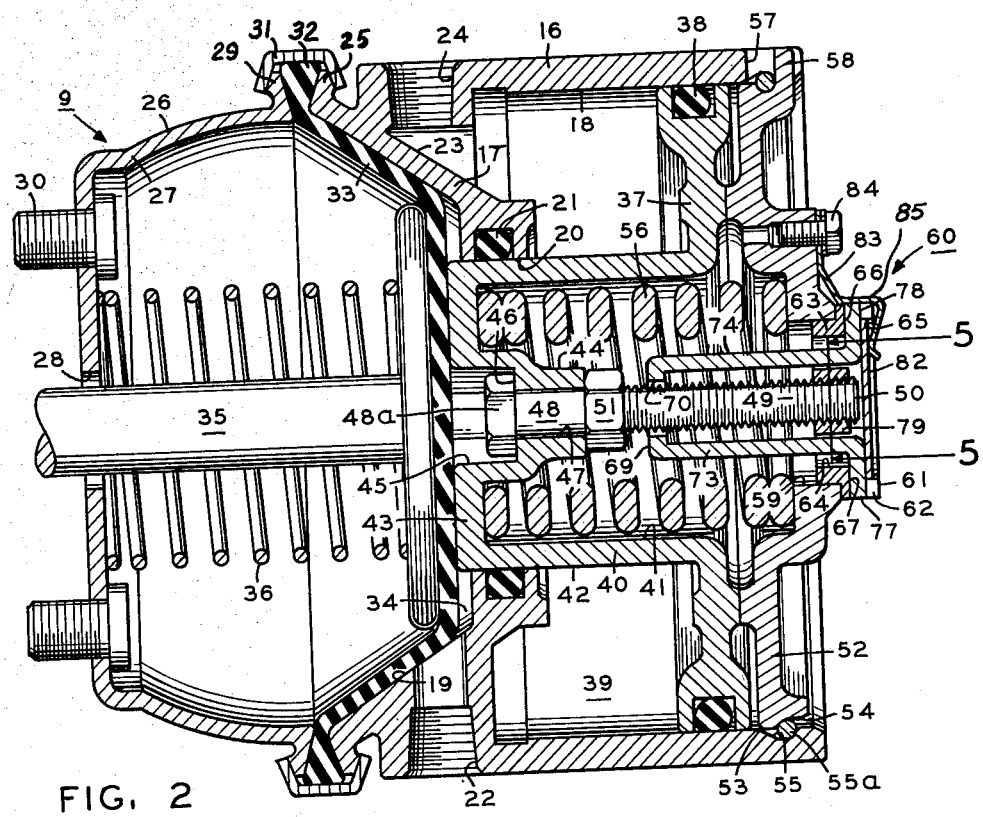
Figure 3:
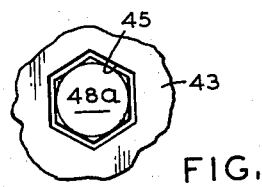
Figure 5:
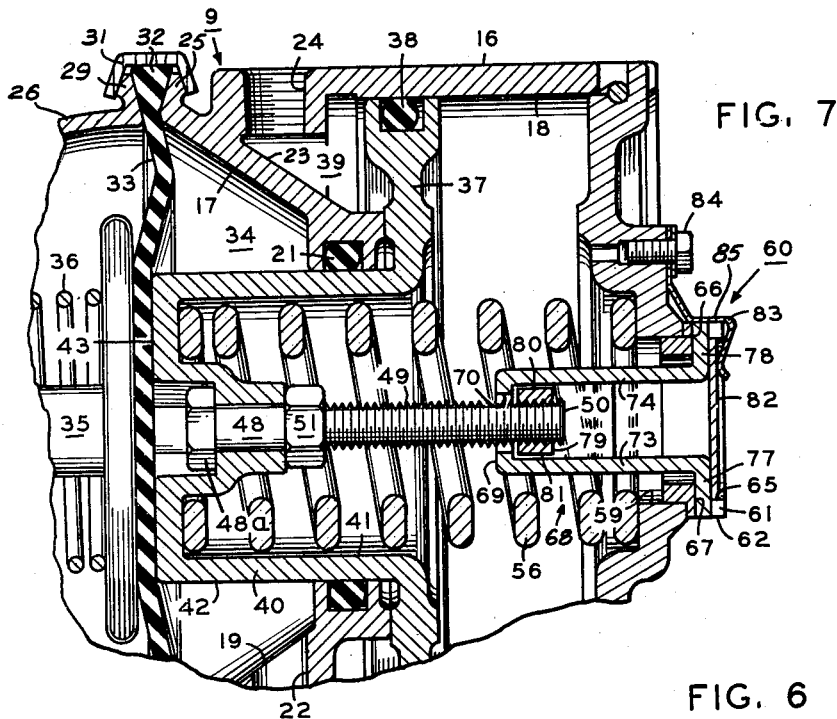
Figure 5:
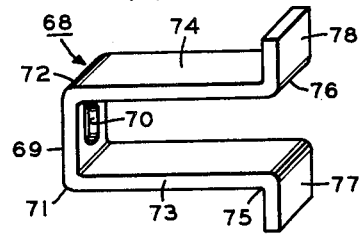
Figure 4:
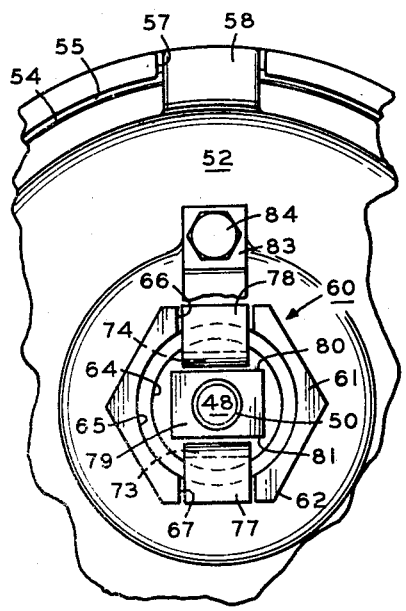

The invention also consists in the parts and arrangement and combination of parts hereinafter described and claimed. In the accompanying drawings which form a part of the specification and wherein like numerals refer to like parts wherever they occur:

FIG. 1 is a diagrammatic view of an actuating system for a friction device with the friction device operating mechanism embodying the present invention shown therein, FIG. 2 is a greatly enlarged cross-sectional view of the friction device operating mechanism shown in FIG. 1, FIG. 3 is a fragmentary left-end view of the power piston in the friction device operating mechanism of FIG. 2, FIG. 4 is a fragmentary right-end view of the friction device operating mechanism of FIG. 2 with the dust shield removed and the retaining spring therefor partially broken away, FIG. 5 is a fragmentary cross-sectional view taken along line 5—5 of FIG. 2, FIG. 6 is an isometric view of a U-shaped strap which forms an essential element of the disabling means for the friction device operating mechanism of FIG. 2, and FIG. 7 is a fragmentary cross-sectional view showing the power piston of the friction device operating mechanism of FIG. 2 in an operative position.

Referring now to FIG. 1 in detail, a friction device actuating system, indicated generally at 1, is provided with fluid pressure generating means, such as compressor 2, which is connected to an inlet 3 of a charging or control valve 4 by a conduit 5, and a fluid pressure storage reservoir 6 is interposed in the conduit 5 providing in combination with said compressor a source of fluid pressure. Another conduit 7 is interposed between an outlet 8 of the charging valve 4 and the emergency port of a friction device operating mechanism or actuating cylinder 9. The charging valve 4 is provided with rotatable passage means 10 connecting the inlet 3 with the outlet 8; however, said passage means can be rotated clockwise (in the direction of the arrow) to a position interrupting pressure fluid communication between said inlet and outlet and establishing pressure fluid communication between said outlet and an exhaust port 11 to vent said outlet to atmosphere. A conduit 12 has one end intersecting the conduit 5 and the other end thereof connecting with the inlet side of an application valve 13, and another conduit or service line 14 is interposed between the outlet or service side of said application valve and the service or inlet port of the actuating cylinder 9. To complete the system 1, the push rod of the actuating cylinder 9 is pivotally connected with linkage means or an actuating lever, such as slack adjuster 15, for energizing a friction device (not shown).

The actuating cylinder 9, FIG. 2, is provided with a housing 16 having an annular wall 17 therein interposed between a bore 18 in the rightward end of said housing and a tapered bore 19 in the leftward end of said housing, and an aperture or bore 20 having an O-ring seal 21 sealably disposed therein is centrally provided through the wall 17 between the bore 18 and tapered bore 19. A service or inlet port 22 which receives the conduit 14, as previously mentioned, is provided in the housing 16 connecting with the tapered bore 19, and a passage 23 has one end connecting with the bore 18 and the other end thereof connecting with an emergency port 24 which receives the conduit 7, as previously mentioned. The housing 16 is provided with a peripheral flange 25 on the leftward end thereof, and an end plate or fixed housing 26 is provided with a concave or dish-shaped wall 27 having a centrally located venting aperture 28 therein and a peripheral flange 29 positioned in opposed relation with the flange 25. The end plate housing 26 is also provided with a plurality of mounting studs 30 which are fixedly attached to the end wall 27 by suitable means, such as an upset weld, said mounting studs being adapted for connection with a cooperating mounting bracket (not shown) on or adjacent the friction device.

A conventional, releasable clamping band 31 is positioned in clamping engagement with the opposed peripheral flanges 25 and 29 serving to maintain a peripheral bead 32 of a diaphragm 33 in sealable abutting engagement therebetween, and actuating or service chamber 34 is formed in the tapered bore 19 between the diaphragm 33 and the housing wall 17 in pressure fluid communication with the service port 22. A push rod 35 extends coaxially through the venting aperture 28 having an exterior or working end pivotally connected with the slack adjuster 15, as previously mentioned, and an interior end biased into engagement with the diaphragm 33 by the compressive force of a return spring 36 interposed between the housing end wall 27 and said push rod.

An emergency or power piston 37 is slidably received in the housing bore 18 having an O-ring seal 38 disposed in the peripheral portion thereof in sealable engagement with said housing bore, and an emergency chamber 39 is formed in the housing bore 18 between the piston 37 and the housing wall 17 in pressure fluid communication with the passage 23 and emergency port 24. The piston 37 is provided with an integrally formed cylindrical portion or extension 40 having a bore 41 therein and a peripheral surface 42 thereon slidable in the aperture 20 of the housing wall 17 in sealing engagement with the O-ring seal 21, and a working end or end wall 43 is integrally provided on the leftward end of the piston extension 40 closing the bore 41, said end wall being positioned in said actuating chamber 34 normally in abutting engagement with the diaphragm 33. The piston extension end wall 43 is provided with a centrally located, integrally formed projection 44 which extends coaxially into the piston extension bore 41, and as shown in FIGS. 2 and 3, a hexagonally-shaped recess 45 is also provided in the piston end wall 43 forming a shoulder 46 in conjunction with an axial bore 47 which extends through the projection 44. A piston extension, such as stud 48, is received in the projection bore 47 and is provided with a hexagonally-shaped head 48a on the leftward end thereof which is received in the cooperating hexagonally-shaped recess 45 to prevent rotation of the stud member 48. The piston extension 48 is threaded, as at 49, substantially between the mid-portion thereof and a rightward or free end 50 thereof, and a lock nut 51 is cooperatively received on the threaded portion 49 in locking engagement with the rightward or free end of the projection 44 to abut the head 48a with the shoulder 46 and retain said piston extension against axial displacement.

A removable annular base wall 52, FIGS. 2 and 4, is provided with a peripheral surface 53 in sliding and guiding engagement with the rightward end of the housing bore 18, and an annular recess 54 is provided in said peripheral surface. The housing bore 18 is also provided with an annular recess or groove 55 adjacent the rightward end thereof, and a split lock or retaining ring 55a is positioned in said housing groove 55. The compressive force of an emergency spring 56 interposed between the piston extension end wall 43 and the base wall 52 serves not only to bias the piston 37 and extension 40 in a leftwardly working direction but also serves to bias the base wall recess 54 into abutting engagement with the retaining ring 55a in the housing groove 55 to retain said base wall against displacement from the rightward end of said housing bore 18. The rightward end of the housing 16 is slotted at 57, and a wedge or radially extending projection 58 is integrally formed on the base wall 52 and extends into the housing slot 57 to prevent rotation of said base wall in the housing bore 18. The base wall 52 is also provided with a centrally located access aperture 59.

Referring now to FIGS. 2, 4, 5 and 6, emergency release or disabling means, indicated generally at 60, is provided with a driving member 61 having a hexagonally-shaped radially extending head or flange portion 62 for tool receiving purposes which is positioned in bearing engagement with the base wall 52 about the access aperture 59 and an integrally formed cylindrical extension 63 which is rotatably received in said access aperture. A pair of stepped bores 64 and 65 are axially provided through the driving member head and extension 62 and 63, and opposed, radially extending slots or keyways 66 and 67 are provided in said driving member head intersecting with the stepped bore 65.

Referring now to FIGS. 2, 6 and 7, a relatively thin, flat strap or intermediate member 68 having a generally U-shaped configuration is provided with a base portion 69 having an aperture 70 therein. The strap 68 is bent at 71, 72 forming leg portions 73, 74 which coextend substantially at right angles from the base portion 69, and the strap is also bent at substantially right angles at 75, 76 to provide integral outwardly extending flanges or keys 77, 78 on the distal portions of said legs, said keys being in a plane substantially parallel to the plane of said base portion. The keys 77, 78 of the strap 68 are positioned in the keyways 66, 67 of the driving member head 62, and the legs 73, 74 extend through the stepped bore 64 of the driving member 61 into the housing bore 18. The threaded portion 49 of the piston extension 48 extends coaxially through the aperture 70 in the base portion 69 of the strap 68, and a driven member or nut-type connection 79 is normally threadedly received on said piston extension adjacent the free end 50 thereof. The driven member 79 is provided with opposed abutment surfaces 80, 81 which normally abuttingly and slidably engage the legs 73, 74 of the strap 68, and in this manner, a rotational force on the driving member 61 is transmitted to the intermediate strap 68 through the cooperating keyways 66, 67 and keys 77, 78 and therefrom to the driven member 79 through the cooperating strap legs 73, 74 and driven member surfaces 80, 81 to effect further threaded engagement between said driven member and the piston extension 48 (to be more fully discussed hereinafter). Of course, the stepped bore 65 of the driving member 61 may be closed by a disc 82, or the like, if desired, to prevent the entry of foreign particles into the interior of the housing 17, and a retaining or positioning spring 83 has one end connected to the base wall 52 by suitable means, such as a stud 84, while the other end thereof biases the disc 82 into abutting engagement with the keys 77, 78 of the strap 68 to prevent axial displacement thereof from the cooperating keyways 66, 67 in the driving member head 62. The spring 83 is also provided with an abutment portion 85 near the mid-portion thereof for engagement with the driving member head 62 to normally prevent rotation thereof.

In the operation with the component parts of the actuating cylinder 9, as above described, assume that normal operating conditions exist wherein the reservoir 6 is charged with pressure fluid above a predetermined amount from the compressor 2, and said reservoir is connected in fluid pressure communication with the emergency chamber 39 through the passage 23 and emergency port 24 of the housing 16, the conduit 7, the outlet 8, passage means 10 and inlet 3 of the control valve 4, and the conduit 5. The fluid pressure so transmitted to the emergency chamber 39 acts on the effective area of the resiliently urged piston 37 creating an emergency force to position said piston in abutting engagement with the base wall 52 and to overcome the compressive force of the emergency spring 56 maintaining said spring in a compressed position. With the component parts of the cylinder 9 positioned as above described and as shown in the drawing, the friction device (not shown) is de-energized.

If the operator desires to initiate a normal service application to energize the friction device and effect deceleration or a complete stop, a manual force applied on the application valve 13 meters fluid pressure from the reservoir 6 through conduits 5 and 12, said application valve, the service line 14, the service port 22 of the housing 16, and into the service chamber 34. The fluid pressure so established in the service chamber 34 acts on the effective area of the diaphragm 33 to create a service force to move said diaphragm and push rod 35 leftwardly in a working direction to an operative position against the return spring 36 actuating the working end of said push rod to rotate the slack adjuster 15 and energize the friction device. Removal of the applied force from the application valve 13 effects the exhaustion of fluid pressure from the service chamber 34 through the service port 22, the conduit 14 and the exhaust port of the application valve 13 to eliminate the service force, and the return spring 36 thereafter moves the slack adjuster 15, the push rod 35, and the diaphragm 33 to their original positions.

In an emergency condition when the fluid pressure in the reservoir 6 is reduced below the predetermined amount due to leaks in the system 1 or a non-producing compressor, or the like, the fluid pressure in the emergency chamber 39 is correspondingly reduced thereby reducing the emergency force opposing the compressive force of the emergency spring 56. When the magnitude of the spring force overcomes that of the reduced emergency force, the spring 56 moves the piston 37 leftwardly in a working direction in the housing bore 18 toward an operative position, and the piston extension 40 is concertly moved therewith to actuate the leftward or working end 43 thereof in a work-producing direction in the actuating chamber 34 effecting simultaneous leftward movement of the diaphragm 33 and push rod 35 to rotate the slack adjuster 15 and effect a mechanical emergency energization of the friction device. Upon such mechanical energization of the friction device, the piston extension 48 is concertly leftwardly movable with the piston 37 placing the driven member 79 in juxtaposition with the base wall 69 of the strap 68, as shown in FIG. 7. During this mechanical emergency energization of the friction device, it should be noted that the operator may initiate a normal service application, as previously described; however, the fluid pressure introduced into the service chamber 34 acts on the effective area of the piston end wall 43 creating a force in opposition to the compressive force of the emergency spring 56 to prevent the compounding of the spring force and service force.

With the component parts of the system 1 and actuating cylinder 9 positioned as above described, the friction device is now mechanically energized to effect an emergency vehicle stop. Often such vehicle emergency stops occur at inopportune times and place the vehicle in a dangerous position with regard to other vehicles on the road; therefore, after such emergency stops occur, it is often advantageous to move the vehicle to a less dangerous position in order to correct the failure of the system 1 and subsequently re-establish normal operating conditions wherein the system fluid pressure is greater than the predetermined amount.

Disabling or emergency release means 60 are provided to overcome the above described emergency function of the actuating cylinder 9 by releasing the spring 56 and overcoming the force thereof which, in conjunction with the resiliently urged piston 37, serves to mechanically energize the friction device under such emergency operating conditions, as follows. A manual force is applied on the hexagonally-shaped head 62 of the driving member 61 to rotate said driving member in the access aperture 59, and the abutting engagement between the driving member keyways 66, 67 and the driving strap keys 77, 78 imparts the rotational force to the intermediate strap 68; therefore, the abutting engagement between the strap legs 73, 74 and the driven member abutment surfaces 80, 81 also imparts the rotational force from said strap legs to the driven member 79. In response to the rotational force, the driven member 79 is threadedly moved leftwardly on the piston extension 48 while the surfaces 80, 81 slide on the strap legs 73, 74, respectively, and in this manner, said driven member is moved into abutting engagement with the strap base wall 69. After the driven member 79 is engaged with the driving strap base wall 69, further application of the rotational force serves to further threadedly engage said driven member and the piston extension 48 to effect concert rightward movement of the piston 37 and extension 40 against the friction device energizing force of the spring 56. In view of the above, it is apparent that the driving engagement between the driving member 61, intermediate member 68, driven member 79 and piston extension 48 establishes a rigid connection between the piston 37 and the housing base wall 52 which contains the compressive force of the spring 56 therebetween. When the piston extension 48 and piston 37 are concertly moved in a rightward direction for a predetermined distance, the mechanical friction device energizing force of the spring 56 and piston 37 is sufficiently overcome to de-energize the friction device so that the vehicle can be moved to a more advantageous and/or less dangerous position. Of course, the return spring 36 effects rightward movement of the component parts associated therewith in follow-up relation with the rightward movement of the working end 43 of the piston extension 40 to rotate the slack adjuster 15 and de-energize the friction device. With the force of the emergency spring 56 so contained, the clamping band 31 can be removed to replace or service the various component parts in the actuating chamber 34 without fear of the housing 16 being expelled from the fixed end plate 26 by the force of the spring 56. Further, the rigidly connected housing base wall 52 and piston 37 can be removed from the housing bore upon removal of the retaining ring 55a without fear of expulsion since the compressive force of the spring 56 is positively contained.

When the fluid pressure failure of the system 1 has been corrected and the fluid pressure in the reservoir 6 is increased to a value greater than the predetermined amount wherein normal operating conditions are now re-established, the fluid pressure in the emergency chamber 39 of the actuating cylinder 9 is correspondingly increased to re-establish the magnitude of the emergency force. When the magnitude of the emergency force overcomes that of the spring 56 so that the piston 37 and extension 40 can again be maintained in their inoperative positions by said emergency force, a manual force is again applied to rotate the driving member 61 and driving strap 68 to threadedly move the driven member 79 out of engagement with the driving strap base 69 to its original position adjacent the rightward or free end 50 of the driven member 48. Of course, during the above described operation of disabling means 60, the retaining spring 83 is rotatably displaced from engagement with the driving member 61 by merely loosening the stud 84.

The operator may initiate the emergency function of the actuating cylinder 9, if desired, by "dynamiting" the system 1. To "dynamite" the system 1, the operator merely rotates the passage means 10 of the charging valve 4 in a clockwise direction (as shown by the arrow in FIG. 1) to a position aligned between the outlet 8 and exhaust port 11 thereby exhausting pressure fluid from the emergency chamber 39 through the passage 23 and emergency port 24 into conduit 7 and therefrom via said outlet, passage means and exhaust port of the charging valve 4 to the atmosphere. With the emergency chamber vented to atmosphere, the emergency function of the actuating cylinder 9 is initiated, as described hereinbefore, to energize the friction device.

It is now apparent that a novel friction device operating mechanism 9 and disabling means 60 therefor meeting the objects and advantages set out hereinbefore is provided and that changes and modifications in the disclosure may be made by those skilled in the art without departing from the spirit of the invention as defined in the claims which follow.

What I claim is:

1. A friction device operating mechanism comprising a cylinder having an expansible fluid pressure chamber therein, means for introducing fluid pressure into said chamber, resiliently urged means normally opposing fluid pressure expansion of said chamber, a working portion on said resiliently urged means extending through said chamber and exteriorly of said cylinder, said working portion being normally energized by said resiliently urged means when the fluid pressure in said chamber is less than a predetermined amount, threaded extension means connected with said resiliently urged means and disposed in opposing relation to said working portion, disabling means for said resiliently urged means including concertly rotatable driving and driven members relatively movable into driving engagement, said driving member being in bearing engagement with said cylinder and said driven member being in threaded engagement with said extension means, said driving and driven members being concertly rotatable in response to an applied force on said driving member to threadedly move said driven member on said extension means into driving engagement with said driving member, and said driving and driven members being further concertly rotatable subsequent to the driving engagement therebetween to further threadedly engage said driven member and extension means and mechanically move said resiliently urged means in a direction to expand said chamber and de-energized said working portion.

2. A friction device operating mechanism comprising a cylinder, a piston slidable in said cylinder and having a working end extending exteriorly of said cylinder, threaded extension means on said piston means, a driving member rotatably engaged with said cylinder and having abutment means thereon, a driven member threadedly received on said extension means, said driven member being connected in rotatable engagement with said driving member and in lost motion engagement with said abutment means, and spring means urging said piston means in a working direction to energize the working end thereof and move said driven member toward said abutment means, said driving member being rotatable in response to an applied force thereon to rotate and threadedly move said driven member on said extension means into engagement with said abutment means and said driven member being thereafter rotated into further threaded engagement with said extension means to move said piston means in a non-working direction and deenergize the working end thereof.

3. A friction device operating mechanism comprising a housing having a bore therein, piston means slidable in said housing bore and having a working end extending exteriorly of said housing bore, a threaded extension on said piston means, an aperture in said housing substantially co-axial with said extension, a driving member extending through said aperture into said housing bore and co-extensive with at least a portion of said extension means, flange means on said driving member in rotatable bearing engagement with said housing exteriorly of said housing bore, abutment means on said driving member, a driven member threadedly received on said extension means and connected in sliding and rotating driven engagement with said driving member, said driven member being connected in lost motion engagement with said abutment means, and spring means having a compressive force urging said piston means and extension means in a working direction to energize the working end of said piston means and move said driven member into juxtaposition with said abutment means, said driving and driven members being concertly rotatable in response to an applied force on said flange means to threadedly move said driven member on said extension means and slidably move said driven member on said driving means into engagement with said abutment means, and said driving and driven members being thereafter concertly rotatable into further threaded engagement with said extension means to effect movement of said extension means and piston means in a non-working direction against the compressive force of the spring means to de-energize the working end of said piston means.

4. A friction device operating mechanism comprising a cylinder, a piston slidable in said cylinder and having a working end extending exteriorly of said cylinder, a threaded extension on said piston means, aperture means in said cylinder coaxial with said extension, a driving member rotatable in said aperture means, flange means on said driving member in bearing engagement with said cylinder, keyway means in said driving member, an intermediate member including leg means coextensive with at least a portion of said extension, key means on said leg means and normally connected in rotating driven engagement with said keyway means, abutment means on said leg means and spaced from said key means, a driven member threadedly received on said extension and connected in rotating driven engagement and sliding engagement with said leg means, spring means normally urging said piston means in a working direction to energize the working end thereof and move said driven member into juxtaposition with said abutment means, said driving, intermediate and driven members being concertly rotatable in response to an applied force on said flange means to threadedly and slidably move said driven means on said extension means and leg means, respectively, into engagement with said abutment means, and said members being thereafter concertly rotatable to further threadedly engage said driven member and extension means and to effect movement of said piston means in a non-working direction against said spring means and de-energize the working end thereof.

5. A friction device operating mechanism comprising a cylinder, a piston slidable in said cylinder and having a working end extending exteriorly of said cylinder, a threaded extension on said piston means, a first aperture in said cylinder substantially coaxial with said extension, a driving member rotatable in said aperture, flange means on said driving member in bearing engagement with said cylinder, a bore in said driving member, keyway means in said driving member intersecting said bore, and intermediate member including a base portion, a second aperture in said base portion substantially coaxial with said extension, a pair of legs integral with said base portion and coextensive with at least a portion of said extension, a key integrally formed on each of said leg portions and connected in rotative driven engagement with said keyway means, a driven member threadedly received on said extension and having at least one surface thereon connected in sliding and rotative driven engagement with one of said leg portions, said driving member being rotatable in response to an applied force on said flange means to effect concert rotation of said intermediate and driven members, said driven member being threadedly movable on said extension and slidably movable on said one leg portion into abutting engagement with said base portion, and said members being further concertly rotatable subsequent to the abutting engagement of said driven member and base portion to further threadedly engage said driven member and extension and move said piston means and extension in a non-working direction to de-energize the working end of said piston means.

6. A friction device operating mechanism comprising a housing having a bore therein, piston means slidable in said bore, an expansible fluid pressure chamber in said bore on one side of said piston, means for introducing fluid pressure into said chamber, a pair of oppositely disposed extensions on said piston means, one of said extensions extending through said chamber and having a working end exteriorly of said housing bore, the other of said extensions being threaded, a first aperture in said housing and substantially coaxial with said other extension, a driving member having a peripheral surface thereon rotatable in said first aperture, a radially extending flange on said driving member and in bearing engagement with said housing about said first aperture exteriorly of said housing bore, another bore in said driving member substantially coaxial with said other extension, a pair of oppositely disposed and radially extending keyways in said housing bore, another bore in said driving member bore, a relatively flat strap member having a generally U-shaped configuration including a base, a second aperture in said base substantially coaxial with said other extension, a pair of spaced legs integrally formed with said base and extending in substantially parallel planes therefrom, said pair of legs being coextensive with at least a portion of said other extension, a key integrally formed on each of the distal portions of said legs and positioned in rotative driven engagement with said keyways, a driven member threadedly received on said other extension means and connected in lost motion engagement with said base, a pair of surfaces on said driven member in sliding engagement and in rotative driven engagement with said pair of legs, spring means biased between said housing and piston means to urge said piston means in a working direction and oppose fluid pressure expansion of said chamber, said working end of said one extension being energized and said driven means on said other extension being moved toward engagement with said base upon movement of said piston means in the working direction when the fluid pressure in said chamber is less than a predetermined amount, said driving member, strap member and driven member being initially concertly rotatable in response to an applied force on said driving member to threadedly move said driven member on said other extension and slidably move said driven member on said legs into abutting engagement with said base, and said members being further concertly rotatable subsequent to the abutting engagement of said driven member and base to further threadedly engage said driven member with said other extension and mechanically move said piston means in a non-working direction against said spring means to de-energize the working end of said one extension.

References Cited in the file of this patent

UNITED STATES PATENTS

| | | |
|---|---|---|
| 2,754,805 | Beman | July 17, 1956 |
| 3,107,583 | Woodward | Oct. 22, 1963 |
| 3,109,347 | Brodl et al. | Nov. 5, 1963 |
| 3,117,496 | Dobrikin | Jan. 15, 1964 |

UNITED STATES PATENT OFFICE
CERTIFICATE OF CORRECTION

Patent No. 3,149,542                  September 22, 1964

Oliver B. Cruse

It is hereby certified that error appears in the above numbered patent requiring correction and that the said Letters Patent should read as corrected below.

Column 2, line 50, after "and" insert -- an --; column 8, line 59, strike out "housing bore, another bore in" and insert instead -- flange means intersecting with --.

Signed and sealed this 12th day of January 1965.

(SEAL)
Attest:

ERNEST W. SWIDER
Attesting Officer

EDWARD J. BRENNER
Commissioner of Patents